(12) United States Patent
Clagg (10) Patent No.: US 12,185,670 B2
(45) Date of Patent: Jan. 7, 2025

(54) BALE RECEIVING TABLE HAVING A TURNTABLE ASSEMBLY

(71) Applicant: MIL-STAK MANUFACTURING CO., LLLP, Fruitland, ID (US)

(72) Inventor: Randall Clagg, Fruitland, ID (US)

(*) Notice: Subject to any disclaimer, the term of this patent is extended or adjusted under 35 U.S.C. 154(b) by 0 days.

(21) Appl. No.: 18/020,074

(22) PCT Filed: Aug. 7, 2021

(86) PCT No.: PCT/US2021/045134
§ 371 (c)(1),
(2) Date: Feb. 6, 2023

(87) PCT Pub. No.: WO2022/032214
PCT Pub. Date: Feb. 10, 2022

(65) Prior Publication Data
US 2024/0008411 A1   Jan. 11, 2024

Related U.S. Application Data

(60) Provisional application No. 63/063,214, filed on Aug. 7, 2020.

(51) Int. Cl.
*A01D 90/08* (2006.01)
*A01D 87/12* (2006.01)

(52) U.S. Cl.
CPC ........... *A01D 90/08* (2013.01); *A01D 87/126* (2013.01)

(58) Field of Classification Search
CPC .............................. A01D 90/08; A01D 87/126

USPC ........ 248/346.02, 349.1; 108/103, 94; 401/1
See application file for complete search history.

(56) References Cited

U.S. PATENT DOCUMENTS

| | | | | |
|---|---|---|---|---|
| 1,612,901 A | * | 1/1927 | Bates | B60P 1/6436 410/1 |
| 2,170,581 A | * | 8/1939 | Steuber | B61D 45/005 410/1 |
| 3,455,531 A | * | 7/1969 | Baker | A41H 9/02 248/349.1 |
| 3,689,106 A | * | 9/1972 | Young | B62D 53/00 410/1 |
| 4,258,966 A | * | 3/1981 | Grubb, Jr. | A47B 63/062 312/286 |
| 5,080,322 A | * | 1/1992 | Harley | F16M 11/08 108/103 |
| 5,405,229 A | | 4/1995 | Tilley | |
| 5,476,353 A | * | 12/1995 | Mola | A01K 45/005 414/508 |
| 5,478,194 A | * | 12/1995 | Tilley | A01D 90/08 414/501 |

(Continued)

*Primary Examiner* — Gregory W Adams
(74) *Attorney, Agent, or Firm* — Charles R. Clark (57) ABSTRACT

A bale receiving table having a turntable assembly for an agricultural bale transport vehicle for receiving, forming, and manipulating on the turntable assembly successive layers of mid-size or big bales for tilting up and placement on a load table of the transport vehicle. After a transverse bale layer is assembled on the table, the transverse bale layer may be selectively centered on the turntable assembly and selectively elevated along the vertical axis of the turntable assembly and rotated 90 degrees about its horizontal plane to be aligned longitudinal to the table to form a bale tie layer with the integrated bales aligned longitudinal to the table and the transport vehicle.

3 Claims, 7 Drawing Sheets

(56) References Cited

U.S. PATENT DOCUMENTS

| | | | | |
|---|---|---|---|---|
| 5,657,956 | A | * | 8/1997 | Smith ............... F16C 29/046 |
| | | | | 248/371 |
| 5,697,758 | A | | 12/1997 | Tilley |
| 5,749,556 | A | * | 5/1998 | Matsuoka ............ H04N 5/64 |
| | | | | 74/425 |
| 6,148,568 | A | * | 11/2000 | Beasley ............. E04B 1/346 |
| | | | | 104/44 |
| 6,171,046 | B1 | | 1/2001 | Nutcher |
| 6,514,029 | B2 | | 2/2003 | Millsap |
| 8,505,137 | B1 | * | 8/2013 | Gaines, Jr. ......... A61B 6/0487 |
| | | | | 5/601 |
| 9,022,713 | B2 | | 5/2015 | Millsap |
| 9,254,939 | B2 | * | 2/2016 | Scelfo ................ A47B 11/00 |
| 11,390,255 | B1 | * | 7/2022 | Froboese ............. B62H 3/00 |
| 2013/0078074 | A1 | * | 3/2013 | Millsap .............. A01F 25/14 |
| | | | | 414/789.3 |

* cited by examiner

BALE RECEIVING TABLE HAVING A TURNTABLE ASSEMBLY

CROSS-REFERENCE TO RELATED APPLICATION

This application claims the benefit under 35 U.S.C. § 119(e) of U.S. provisional patent application No. 63/063,214 filed Aug. 7, 2020. The entirety of the aforementioned application is herein incorporated by reference.

TECHNICAL FIELD

The present invention relates to the field of mid-size or big bale transport machinery. More particularly, it relates to a bale receiving table having an elevating and rotating bale turntable assembly having a lower more compact operative vertical profile than known prior art bale turntables of bale transport vehicles and designed to allow the selective 90 degree rotation of a tie bale layer before placement of the tie bale layer on a bale load table of the transport vehicle.

BACKGROUND ART

The Millsap U.S. Pat. No. 9,022,713 (rotatable and tiltable receiving table for a mid-size or big bale stack wagon) is representative of a prior art patent that discloses a rotatable bale receiving table for a bale transport vehicle.

The present invention is an improved rearward-hinged, rotatable and tiltable bale receiving table having a forward elevatable and rotatable bale turntable assembly that selectively elevates and rotates a bale layer resting thereupon 90 degrees relative to a preceding bale layer on a mid-size or big bale transport vehicle to criss-cross tie a load of bales together in an agricultural setting. The invention can be used as an operative bale manipulating component in a newly built bale transport vehicle or as a replacement bale receiving table for a preexisting bale transport vehicle especially when replacing a rearward-hinged non-rotating bale receiving table. Preferably, the invention equips a mid-size or big bale transport vehicle having a Mil-Stak® bale loader previously installed or concurrently being installed.

The invention enables the lifting, rotating, and depositing of one mid-size or big bale or a bale layer of a plurality of mid-size or big bales onto a rear-hinged load table of said vehicle for consolation into a load with other bale layers for transport from the field. The invention allows a selective 90 degree rotation of a bale layer relative to a preceding bale layer already on the rear-hinged load table.

SUMMARY OF THE INVENTION

The invention can serve as a useful component in the manufacture of a bale transport vehicle or as a useful later modification of an existing bale transport vehicle having a rearward-hinged non-rotating bale receiving table forward of a rear-hinged stack load table. The invention in its preferred embodiment allows the quick and easy conversion of the transport vehicle from having a non-rotating receiving table to having a more useful bale receiving table having a forward elevating and rotating bale turntable assembly. The invention also allows quick and easy conversion back to a non-rotating receiving table bale transport vehicle.

Figure 1:
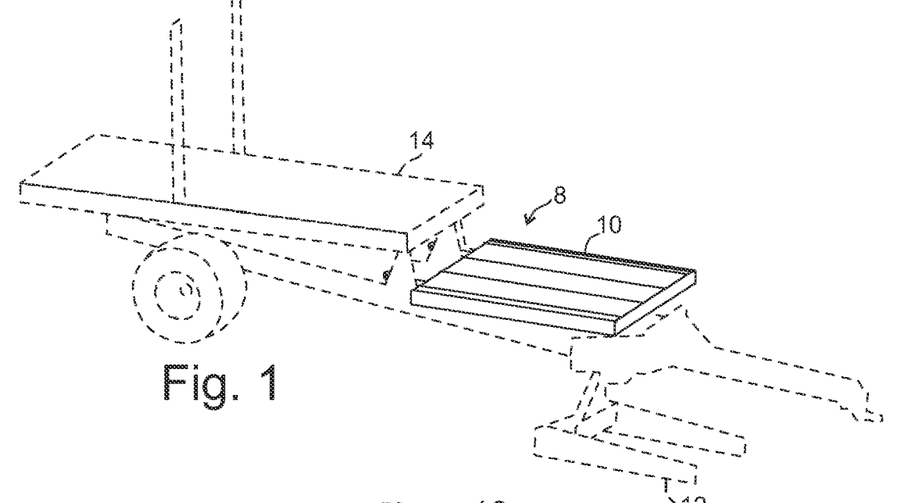
FIG. 1 is a perspective view from above of a prior art bale transport vehicle 8 having a prior art rectangular non-rotating bale receiving table 10, a Mil-Stak® loader 12, and a rearward-hinged load table 14.
Figure 2:
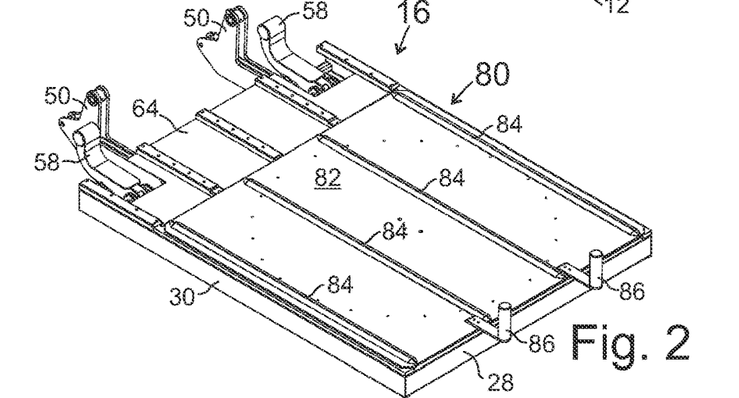
FIG. 2 is a perspective view of an improved bale receiving table 16 having a forward mounted bale turntable assembly 80 showing two bale push bars 58 in a rearward lowered position.
Figure 3:
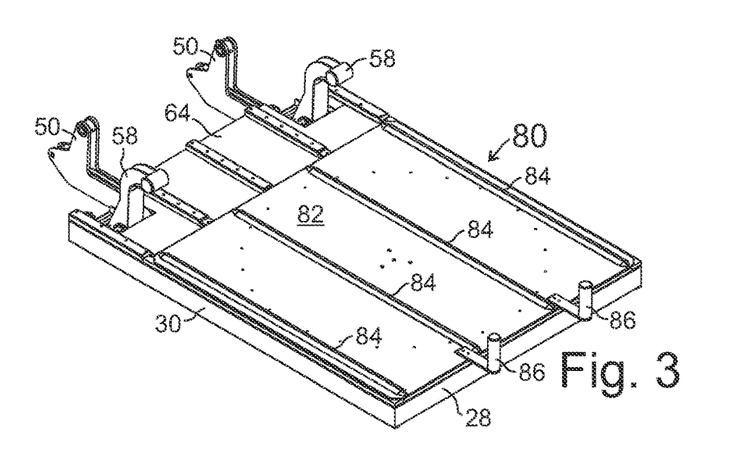
FIG. 3 is a perspective view of the bale receiving table 16 shown in FIG. 2 showing two bale push bars 58 in a forward elevated position.
Figure 4:
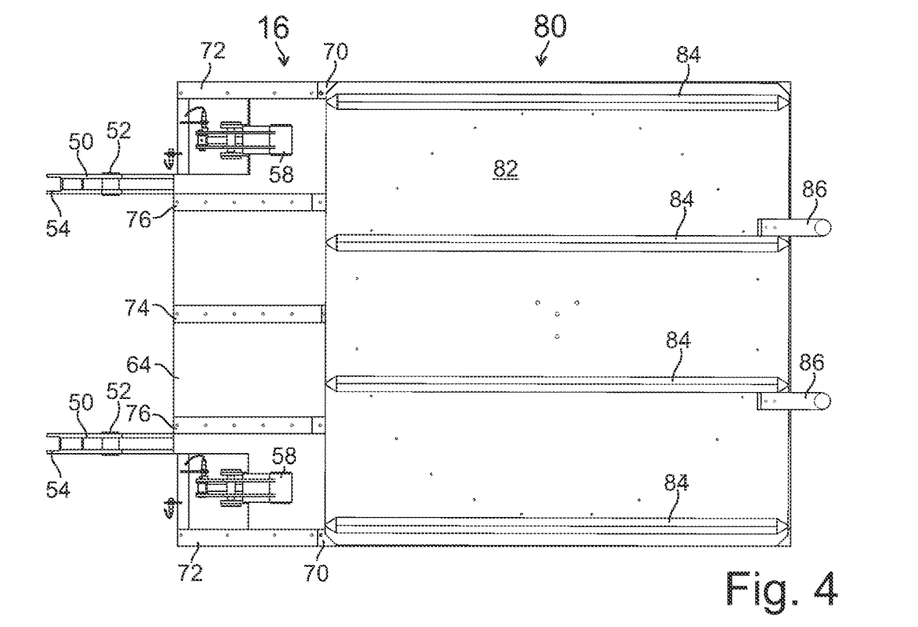
FIG. 4 is a top plan view of the bale receiving table 16 shown in FIG. 3.
Figure 5:
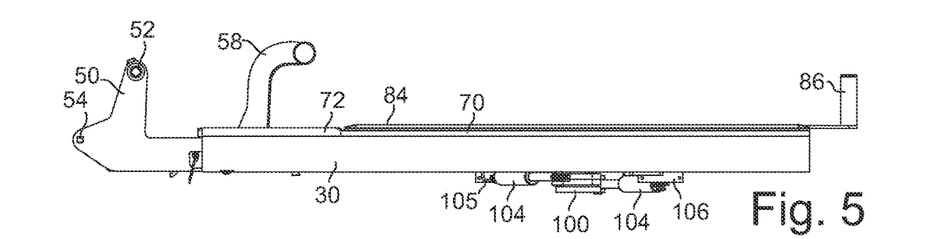
FIG. 5 is a side plan view of the receiving table 16 shown in FIG. 4 showing the bale push bars 58 in an forward elevated position.
Figure 6:
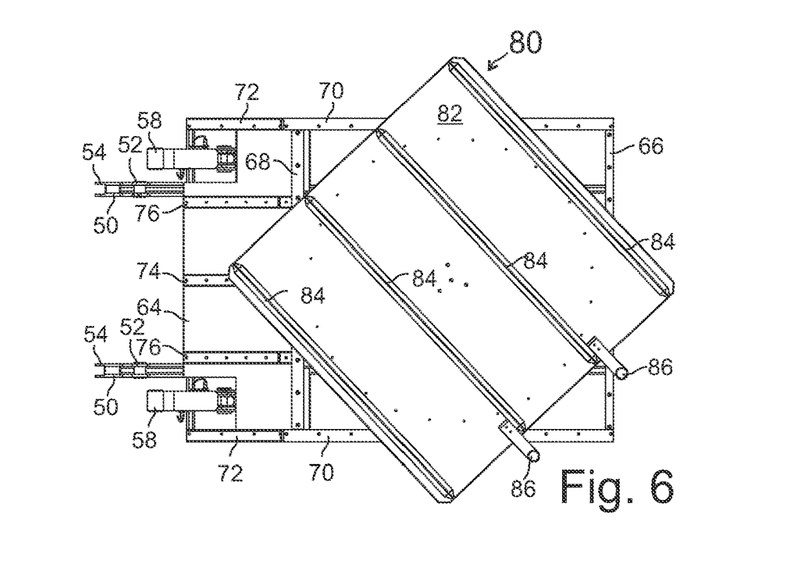
FIG. 6 is a top plan view of the bale receiving table 16 shown in FIG. 5 showing the bale push bars 58 in a rearward lowered position and a planar square turntable structural plate 82 partially rotated in a transitional 45 degree position.
Figure 7:
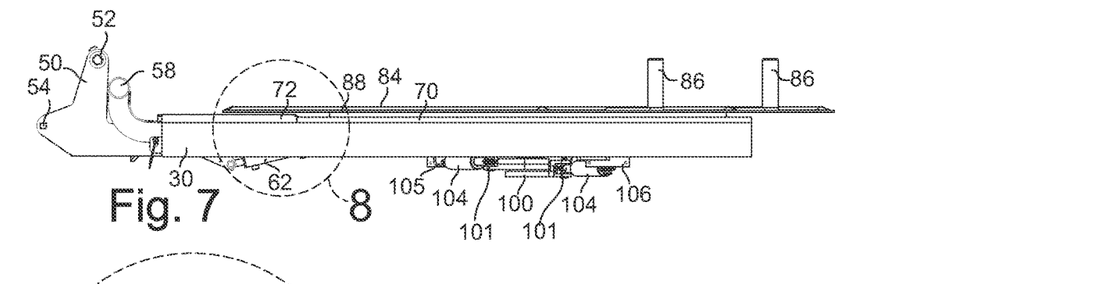
FIG. 7 is a side plan view of the bale receiving table 16 shown in FIG. 6 showing said bale push bars 58 in a rearward lowered position and a turntable structural plate 82 partially rotated in a transitional 45 degree position.
Figures 8, 9, 10:
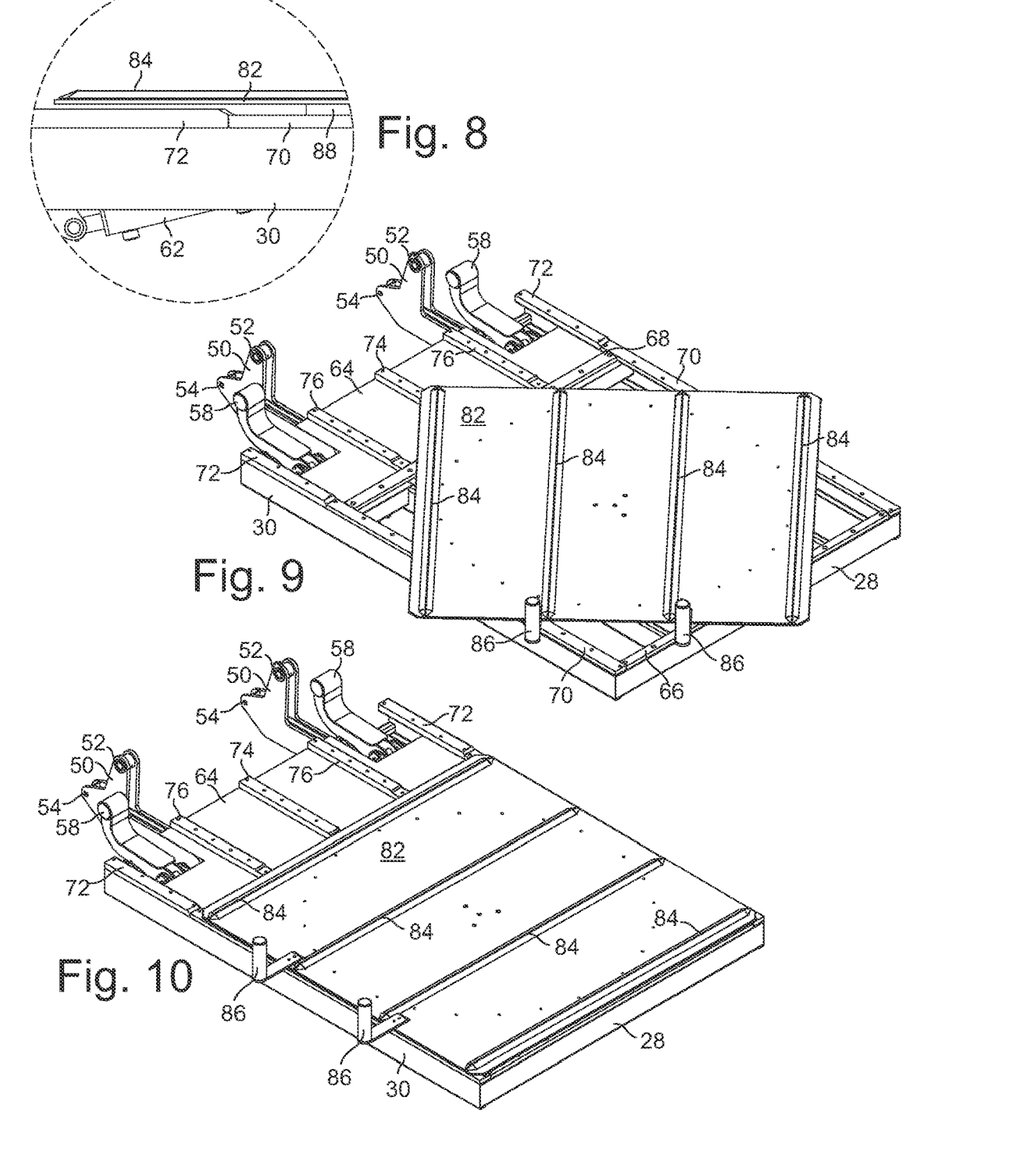
FIG. 8 is an enlarged view of a designated portion of the bale receiving table 16 shown in FIG. 7.
FIG. 9 is a perspective view of the bale receiving table shown in FIG. 2 showing bale push bars 58 in a rearward lowered position and a turntable structural plate 82 partially rotated in a transitional 45 degree position.
FIG. 10 perspective view of the bale receiving table shown in FIG. 8 showing bale push bars 58 in a rearward lowered position and a turntable structural plate 82 fully rotated in a transverse 90 degree position.
Figure 11:
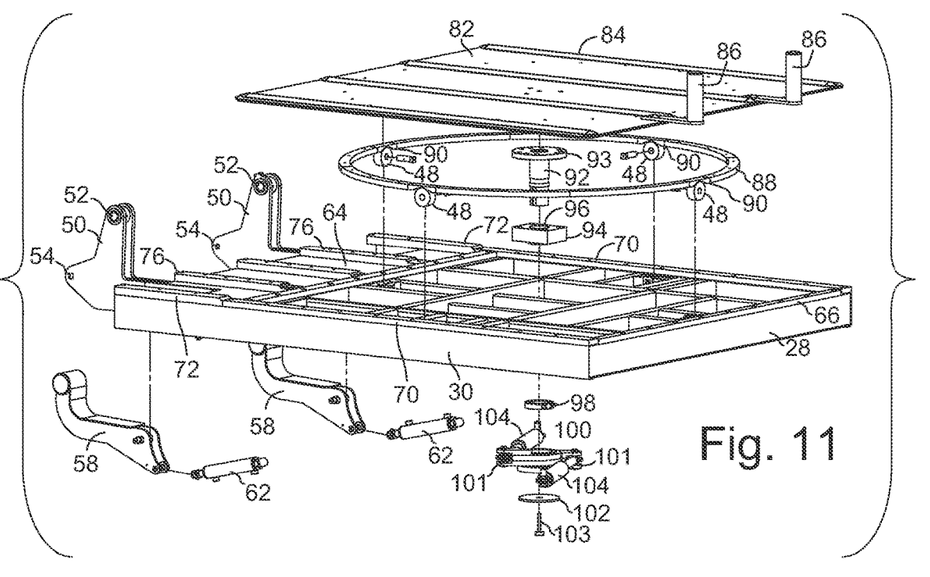
FIG. 11 is a perspective, partially exploded view from above of the bale receiving table 16 shown in FIG. 4 showing a rectangular table frame 20 of a best embodiment of the invention, an upper turntable structural plate 82, a turntable roller track ring 88 having a plurality of spaced ramped roller detents 90, and showing a corresponding cooperative plurality of table rollers 48.
Figure 12:
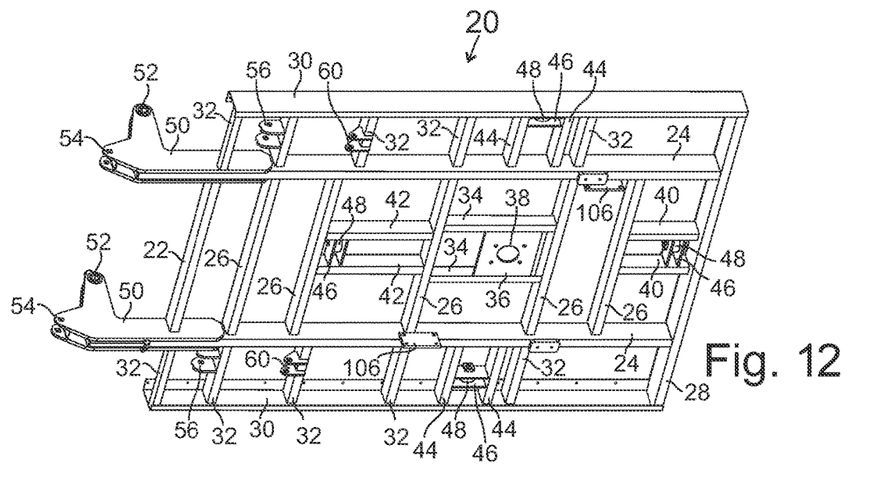
FIG. 12 is a perspective, partially exploded view from below of the bale receiving table 16 shown in FIG. 11.
Figure 13:
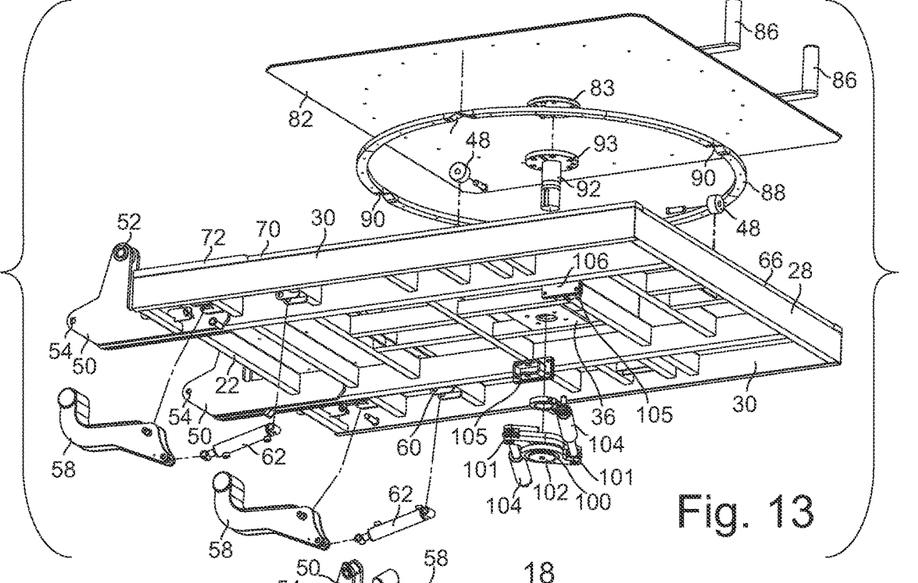
FIG. 13 is a perspective view from below of the bale receiving table 16 shown in FIG. 2.
Figures 14, 15, 16, 17:
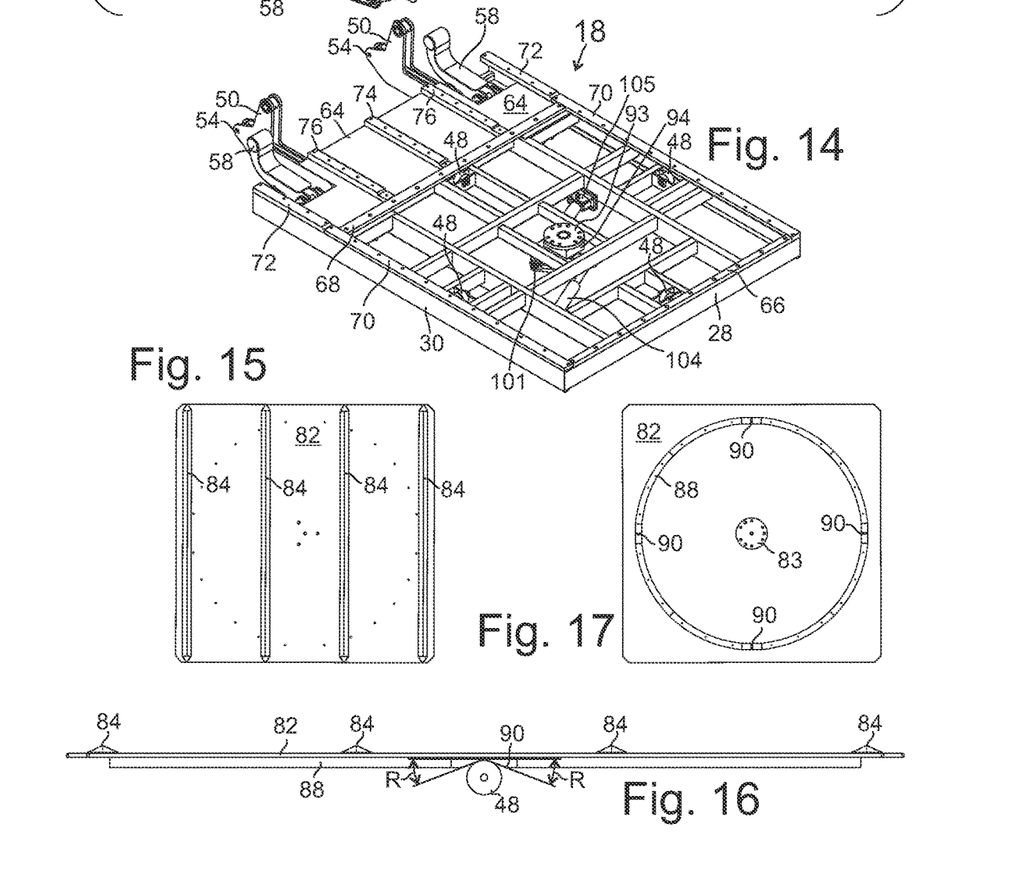
FIG. 14 is a perspective, partial view from above of the bale receiving table 16 shown in FIG. 2 partially showing a rearward-hinged rectangular receiving table frame assembly 18 (the upper turntable structural plate 64 and the attached turntable roller track ring 88 not shown)
FIG. 15 is a top plan view of a turntable plate 82 (bale stops not shown)
FIG. 17 is a partial, bottom plan view of the turntable assembly 80 showing an upper turntable structural plate 82 and showing a turntable roller track ring 88 and a spindle assembly attachment plate 83 both centered and attached to the underside of said structural plate, and said ring having four ramped roller detents 90 radially spaced and distributed 90 degrees one from another along the lower surface of said ring.
Figure 18:
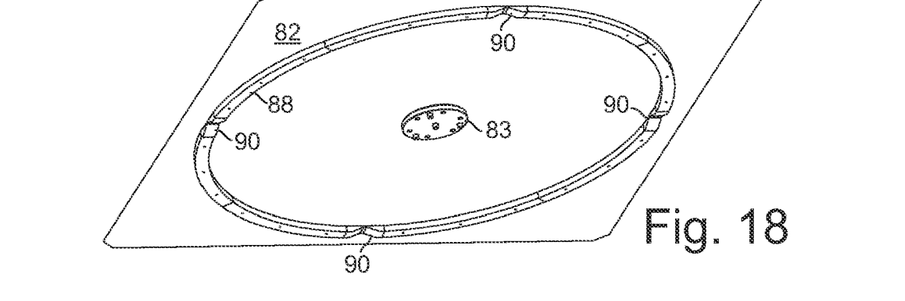
FIG. 18 is a perspective, partial view from below of the upper turntable structural plate 82 showing a roller track ring 88 and a spindle assembly attachment plate 83 both centered and attached to the underside of the structural plate.
Figure 19:
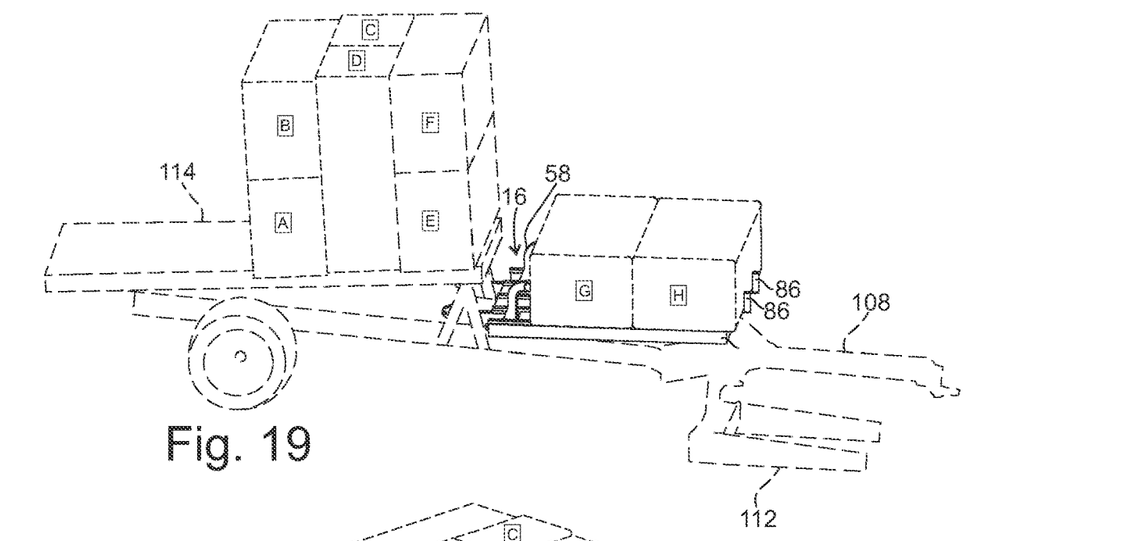
FIG. 19 is a perspective view from above of a bale transport vehicle 108 having a bale receiving table 16 loaded with two bales (bales G and H) registered upon the turntable assembly and three bale layers (bales A and B, bales C and D, and bales E and F) on a load bed 114 of said transport vehicle.
Figure 20:
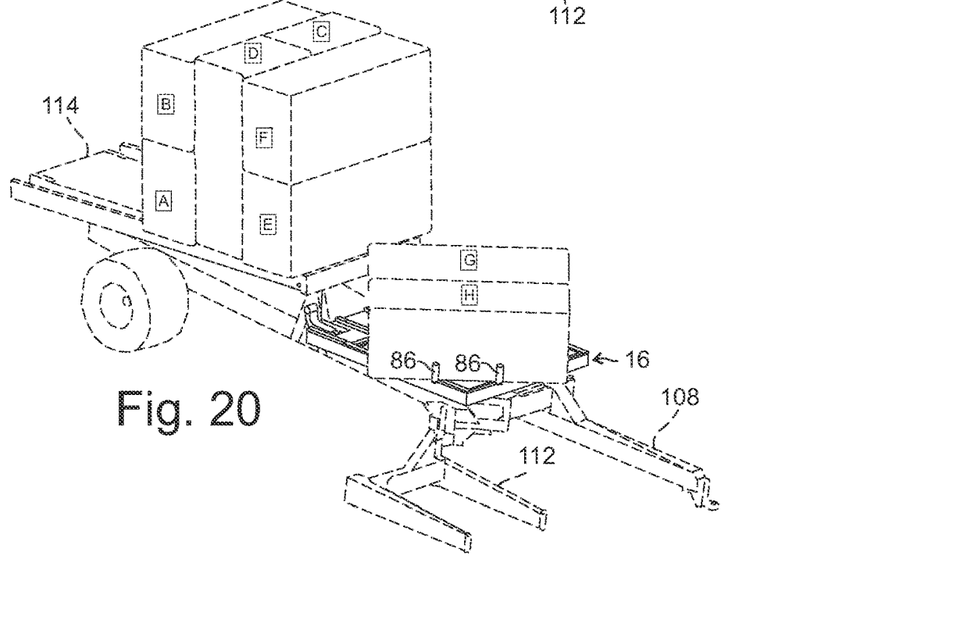
FIG. 20 is a perspective view from above of said bale transport vehicle 108 shown in FIG. 19 and showing said turntable assembly and said two bales G and H thereon partially rotated in a transitional 45 degree position relative to the longitudinal axis of the vehicle.
Figure 21:
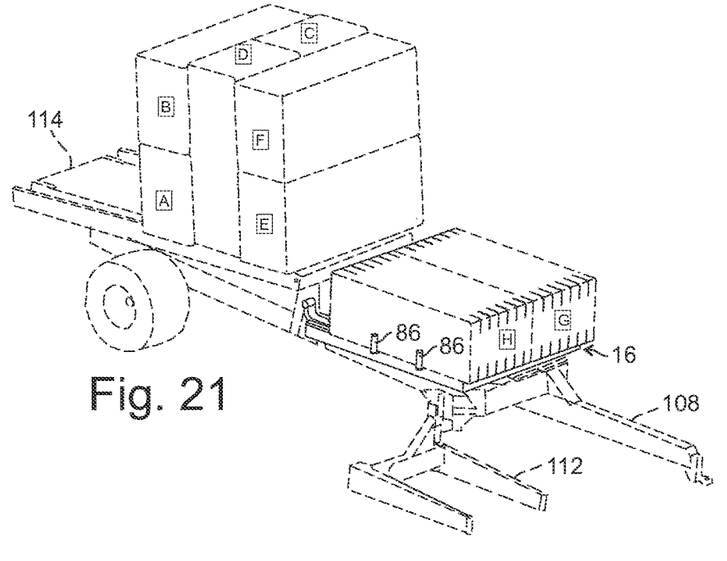
FIG. 21 is a perspective view from above of said bale transport vehicle shown in FIG. 19 and showing said turntable assembly and said two bales G and H thereon fully rotated in a transverse 90 degree position relative to the longitudinal axis of the vehicle.
Figure 22:
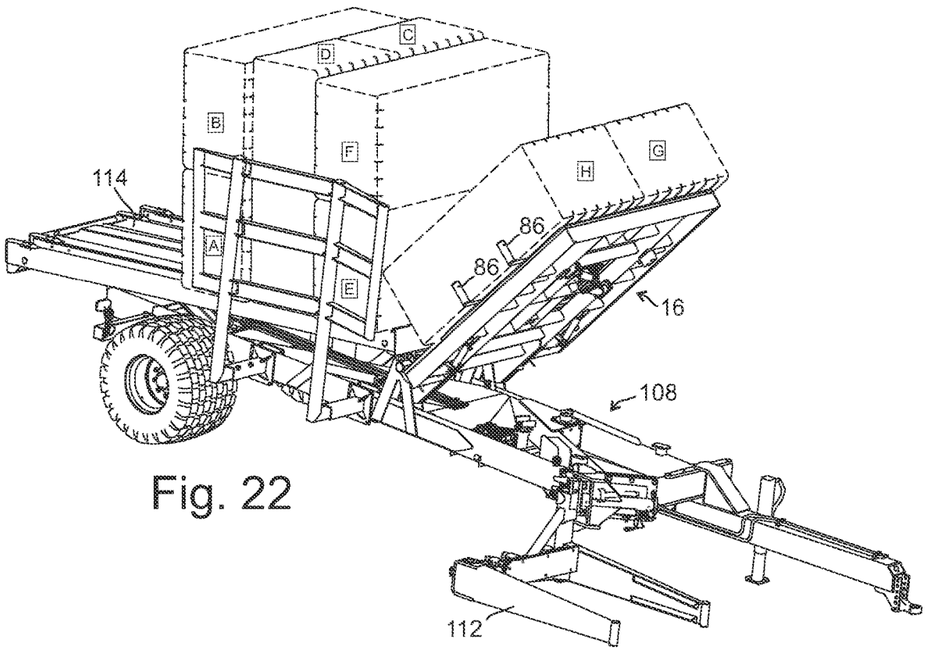
FIG. 22 is a perspective view from above of the bale transport vehicle 108 shown in FIG. 19 and showing the turntable assembly and the tie bale layer of two bales G and H thereon fully rotated in a transverse 90 degree position relative to the longitudinal axis of the vehicle and the tie bale layer being raised towards the load bed 114 and three layers of bales already on the load bed.

The invention provides a novel answer to the question: how to get one rectangular receiving table of a bale transport vehicle holding a bale layer of a plurality of mid-size or large rectangular bales to rotate said bale layer about a generally vertical axis in close proximity to a rectangular stack load table? The present invention solves the problem by providing a rectangular bale receiving table having a forward bale turntable assembly in a lowered position and said turntable assembly having a square shaped rotating planar upper turntable structural plate oriented longitudinal to said table at the forward end of said table, and having two spaced bale push bars attached to rearward portions of said table that can be selectively raised to push forward and register an overlaying transverse bale (transverse to said table) or a bale layer of a plurality of transverse bales upon a top surface of said structural plate and then said push bars lowered to allow said turntable structural plate and said transverse bales thereon to be selectively and initially elevated upward and rotated about four degrees in and from an initial horizontal rotational plane of said plate in said lowered position to reach an elevated higher horizontal rotational plane and then rotated in said higher rotational plane a further about 82 degrees and then lowered and rotated a further about four degrees to return to said initial horizontal rotational plane with said structural plate then oriented transverse to said table and said bales then oriented longitudinally to said table. The elevation of said turntable structural plate allows a corner portion and following portions of said plate to swing with physical clearance over proximate vertically overlapping rearward portions of said rectangular bale receiving table, see FIGS. 6, 9, and 20.

The present invention, a rearward-hinged bale receiving table having an elevatable and rotatable turntable assembly permits a novel and selective elevating, selective rotating, and selective depositing of a bale layer from said receiving table onto a proximate rear-hinged stack load table of a bale transport vehicle.

A principal objective of this invention is to provide a novel and improved rearward-hinged bale receiving table having an elevatable and rotatable bale turntable assembly for a mid-size or big bale transport vehicle that is lightweight, compact, simple, low-maintenance, and reliable for use in a system that permits a farmer or other user to reversibly modify an existing non-rotating bale receiving table bale transport vehicle into a more efficient and compact agricultural tool.

In a preferred embodiment, the invention is easily attached to a new bale transport vehicle during manufacture or attached to a multitude of preexisting bale transport vehicles such as a Mil-Stak™ pull-type stacker wagon by removal of an original rearward-hinged, non-rotatable bale receiving table and replacement with a rearward-hinged bale receiving table having a bale turntable assembly attached to said bale transport vehicle by a plurality of conventional pins and clips or a plurality of bolts and nuts, and by easy connection of a plurality of hydraulic lines of a plurality of hydraulic actuators of the invention added to a hydraulic system of a newly built bale transport vehicle or of said pre-existing bale transport vehicle.

A further object of this invention involves a method of converting a mid-size or big bale transport vehicle having a rear-hinged non-rotatable bale receiving table closely forward from a rear-hinged load table into a more capable vehicle that after conversion can selectively move a bale layer on said table first laterally forward to register said layer on a forward mounted preferably table-wide square bale turntable structural plate 82 and then selectively elevate and rotate said bale layer 90 degrees relative to a preceding bale layer of a stack load of said vehicle before raising said rotated bale layer to said load table to criss-cross tie stack load into a more integrated and stable load of bales.

The rearward-hinged bale receiving table in the preferred embodiment relevant to a modification of a preexisting bale transport vehicle having a rearward-hinged non-rotating bale table having two table tilting actuators each having two hydraulic lines preferably comprises said two table tilting actuators and four additional hydraulic actuators and eight additional quick connect hydraulic lines as each hydraulic actuator generally requires the hook up of two hydraulic lines. The eight additional hydraulic lines selectively can be powered by a hydraulic system of a preexisting bale transport vehicle or by a hydraulic system of a newly manufactured bale transport vehicle in a manner well understood by a person reasonably skilled in the hydraulic power art.

The control of the invention's actuators may be accomplished by selective manual controls or by utilization of a suitable system of custom control software to control said hydraulic system and to control said additional actuators.

The present invention primarily uses simple nuts and bolts and quick connect hydraulic lines to facilitate easy and reversible conversion of a preexisting mid-size and big bale transport vehicle having a rearward-hinged, non-rotating bale receiving table to become a mid-size and big bale rearward-hinged bale transport vehicle having an improved rearward-hinged bale receiving table having a novel bale turntable assembly and back to become said bale transport vehicle having a rearward-hinged, non-rotating bale receiving table. After the modification as taught herein, subsequent conversion to or from one configuration to the other can be efficiently and quickly accomplished.

The preferred embodiment uses hydraulic actuators, but other comparable linear actuators including pneumatic actuators could be used.

Additional and various other objects and advantages attained by the invention will become more apparent as the specification is read and the accompanying figures are reviewed.

BRIEF DESCRIPTION OF DRAWING

FIG. 16 is a partial, side plan view of the turntable assembly 80 shown in FIG. 15 showing the side profile and cooperating relationships between the turntable structural plate 82, the roller track ring 88, the ramped roller detents 90, and the table rollers 48, said rollers support said track ring to and from an elevated plane during turntable structural plate rotation and turntable structural plate elevation (preferably when said plate is oriented transverse and also when oriented longitudinally in a best embodiment the ring is supported just slightly above said table rollers by two transverse wear strips and two forward side wear strips mounted on the table frame 20 in a square array oriented transverse to said frame and that border beneath the turntable structural plate and that in a best embodiment contact the lower surface of said structural plate when lowered with said structural plate oriented transverse to said table and when lowered with said structural plate oriented longitudinal to said table to lessen the wear and tear on the table rollers by the heavy bale layers on said structural plate that may weigh generally between 1200 and 4000 pounds);

DESCRIPTION OF EMBODIMENTS

Referring to FIGS. 1 to 22, the present invention is a novel rearward-hinged bale receiving table 16 having a novel turntable assembly 80 for a bale transport vehicle 108 or for a preexisting bale transport vehicle 8. A method of using said bale receiving table 16 provides for selectively elevating and rotating and depositing a bale layer from the receiving table on to a rear-hinged load bed 14, 114 of said vehicle. The bale receiving table 16 in its preferred embodiment is intended for original equipment manufacturing bale receiving tables of newly manufactured bale transport vehicles and is intended as an improved replacement table for a previously mounted non-rotatable bale receiving table of a preexisting transport vehicle.

The elements of the invention, a bale receiving table 16 for mounting on a bale transport vehicle having a rear-hinged load table and said vehicle previously equipped or concurrently equipped with a Mil-Stak® bale loader 12, 112 or a similar bale loader that places each bale picked up from a surface of a field transverse across said table comprise:

a rearward-hinged rectangular receiving table frame assembly 18 comprising:
a rectangular table frame 20 comprising:
a rear cross beam 22 connected perpendicularly between respective rear portions of a pair of spaced longitudinal main rails 24 that are spaced parallel from and bracketing the longitudinal centerline of said frame;
a plurality of parallel inner cross support beams 26 distributed and joined between and to said main rails;
a front cross beam 28 joined perpendicularly between and to said main rails forward of said cross support beams;
a pair of spaced outer longitudinal side rails 30 spaced from one another and laterally beyond said main rails;
a plurality of outer cross support beams 32 distributed and joined respectively between and to said main rails and said side rails;
a pair of spaced longitudinal turntable mount rails 34 spaced parallel from and bracketing the longitudinal centerline of said frame and joined between and to two facing selected said inner cross support beams;
a turntable mounting plate 36 having a centered vertical spindle block bore 38 attached and joined between said turntable mount rails,
a pair of spaced longitudinal front roller mount rails 40 spaced parallel from and bracketing the longitudinal centerline of said frame and joined between and to said front cross beam and said forward-most said inner cross support beam;
a pair of spaced longitudinal rear roller mount rails 42 spaced parallel from and bracketing the longitudinal centerline of said frame and joined between and to a pair of selected said inner cross support beams rearward of said turntable mounting plate;
two pairs of spaced transverse side roller mount rails 44, each said pair spaced parallel from and bracketing the transverse centerline of said spindle block bore 38;
a plurality of roller mounts 46 joined to said table frame respectively with one roller mount joined between each said pair of facing roller mount rails, said roller mounts spaced radially and distributed along a selected circular path centered on the longitudinal centerline of said table frame 20 and coaxial with said spindle block bore 38;
a plurality of table rollers 48 spaced radially and distributed one from another around a selected circular path defined by a selected roller track ring 88 of a forward bale turntable assembly 80 with the axis of rotation of each said roller in the same plane and each axis of rotation intersecting the vertical axis of said track ring and with each said roller equidistant from the centerpoint of said spindle block bore and rotatably and respectively mounted to one of said roller mounts and with said rollers mounted in a selected plane parallel to the plane of the upper surface of said table frame;
two spaced main pivot arms 50 attached to rearward portions of said table frame, and each said pivot arm having a pivot arm bore 52 coaxial one to another and, a table tilt actuator attachment bore 54 coaxial one to another;
two sets of push bar mounts 56; attached to selected underlying portions of said table frame;
two spaced bale push bars 58 attached respectively and operatively to one of said spaced sets of push bar mounts;
two sets of push bar actuator mounts 60 attached to selected underlying portions of said table frame;
two push bar actuators 62 attached respectively and operatively between one of said push bar actuator mounts and one of said push bars;
an upper rearward structural table plate 64 attached to a rearward upper portion of said table frame;
a UHMW front transverse wear strip 66 spaced from a UHMW rearward transverse wear strip 68;
two UHMW forward side wear strips 70 spaced one from the other the same distance as said transverse wear strips are spaced one from the other, thereby defining an open square that is bordered by upper coplanar surfaces of said transverse wear strips and said forward side wear strips centered around the vertical axis of said spindle block bore;
two spaced UHMW outer rearward side wear strips 72 attached to outer portions of said rearward structural table plate spaced from and bracketing a UHMW rearward centerline wear strip 74 attached to said table plate on the longitudinal centerline of said frame;
two spaced UHMW inner rearward wear strips 76 spaced from and bracketing said centerline wear strip;
a forward bale turntable assembly 80 comprising:
an elevatable and rotatable planar upper turntable structural plate 82 (in a best embodiment said turntable structural plate is square and overlies said open square);
preferably a spindle attachment plate 83 is attached centrally to the underside of said turntable structural plate;
a plurality of spaced longitudinal bale guide ribs 84 distributed across and attached to the upper surface of said turntable structural plate;
a plurality of spaced turntable bale stops 86 adjustably attached to said turntable structural plate to adjustably extend beyond the front edge of said turntable structural plate;

a circular turntable roller track ring 88 having a plurality of track ring ramped roller detents 90 (in a best embodiment the plurality numbers four), said ramps distributed and spaced radially 90 degrees one from another and corresponding to and cooperating with said plurality of rollers, each said detent having two intersecting ramps inclined downward from the horizontal plane of said track ring at a selected angle selected from a range of 18 to 24 degrees;

a turntable spindle shaft 92 attached perpendicularly to the lower surface of said turntable structural plate at the center-point locus of said plate;

preferably said spindle shaft having an upper shaft attachment flange 93 that can be reversibly attached coaxially to said spindle attachment plate 83;

a turntable spindle shaft bearing block 94 having a centered vertical spindle shaft block bore 96, attached to said mounting plate with said block bore coaxial to said spindle bore 38, said bearing block having a centered vertical spindle shaft block bore 96 sized to receive and rotatably retain said spindle shaft inserted therein and allow said shaft and said turntable structural plate some amount of operative up and down movement during rotation of said shaft and said structural plate;

a spindle shaft set collar 98 reversibly secured coaxially to said spindle shaft spaced below said mounting plate to limit said shaft operative up and down movement during rotation of said shaft;

a spindle shaft bellcrank 100 having two spread turntable rotation actuator mounting arms 101 and a central transverse bore sized to receive and retain a lower distal end of said spindle shaft inserted therein, said bellcrank reversibly secured to said spindle shaft, preferably by a shaft retainer cap 102 and a coaxial bolt 103 below said bellcrank;

two turntable rotation actuators 104 each said rotation actuator attached respectively between one of said mounting arms and a selected portion of said table frame 20, in a best embodiment each said actuator attached respectively between one of said mounting arms and a respective one of two rotation actuator mounts 105, said actuator mounts attached to said table frame 20, and preferably each said actuator mount is attached respectively to one of two actuator mounting plates 106 attached respectively to one of two said main rails 24 or other suitable selected portions of said table frame.

The actuators of the invention are powered by a hydraulic system of the vehicle and the hydraulic lines are not shown to allow a clearer viewing of the structural elements of the invention. A majority of the structural components of the invention are preferably made from sheet or plate steel stock, round, channel or square steel tubing stock, or other suitable materials used in making the preexisting receiving table or other prior art receiving tables. Means of joining of elements of the invention one to another preferably may include welding. In the best embodiment, the UHMW block and UHMW wear strips are fabricated from a high strength, durable ultra high molecular weight plastic material.

From the preceding, it should be apparent that the present invention provides a novel receiving table having a turntable assembly and methods that allow for convenient, easy modification of a bale transport vehicle having a nonrotating receiving table that is replaced with said receiving table having said turntable assembly to permit the tilting, rotating, and depositing of a bale layer from the receiving table to a rear-hinged load table of said bale transport vehicle.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

I claim:

1. A rectangular bale receiving table having a forward bale turntable assembly for a mid-size or big bale transport vehicle for receiving and manipulating a plurality of bales and a related bale layer for deposit on a rear-hinged load table of said vehicle comprising:

a receiving table frame assembly operatively attached to a bale turntable assembly, said turntable assembly having an elevatable and rotatable planar upper turntable structural plate, said turntable structural plate having an underlying and attached planar and circular roller track ring, said track ring having a plurality of at least three ramped roller detents spaced and distributed along the underside of said track ring, said track ring supported from below by a plurality of at least three table support rollers, said support rollers roll below said track ring during forward and backward rotation of 90 degrees of rotation in a generally horizontal plane of said ring and plate and sequential elevation of said ring and plate as said rollers rotationally engage said detents, said turntable structural plate has an at rest position in a lower horizontal plane generally parallel to the horizontal plane of said table and transitions to a higher horizontal plane during transition of the 90 degrees from fore and aft to transverse to said table, and returns to said lower horizontal plane as said rollers engage said detents at the end of the 90 degrees of rotation and return said track ring and said structural plate to said lower horizontal plane in said transverse position, and connection of actuators to a suitable power system of said vehicle or to an auxiliary power system operatively attached to said table.

2. A rectangular bale receiving table for mounting on a mid-size or big bale transport vehicle having a rear-hinged load table and said vehicle previously equipped or concurrently equipped with a bale loader that places each bale picked up from a surface of a field transverse across said table comprising:

A. a rearward-hinged rectangular receiving table frame assembly comprising:

a rectangular table frame comprising:

a rear cross beam connected perpendicularly between respective rear portions of a pair of spaced longitudinal main rails that are spaced parallel from and bracketing the longitudinal centerline of said frame;

a plurality of parallel inner cross support beams distributed and joined between and to said main rails;

a front cross beam joined perpendicularly between and to said main rails forward of said cross support beams;

a pair of spaced outer longitudinal side rails spaced from one another and laterally beyond said main rails;

a plurality of outer cross support beams distributed and joined respectively between and to said main rails and said side rails;

a pair of spaced longitudinal turntable mount rails spaced parallel from and bracketing the longitudinal centerline of said frame and joined between and to two facing selected said inner cross support beams;

a turntable mounting plate having a centered vertical spindle block bore attached and joined between said turntable mount rails, a pair of spaced longitudinal front roller mount rails spaced parallel from and bracketing the longitudinal centerline of said frame and joined between and to said front cross beam and said forward-most said inner cross support beam;

a pair of spaced longitudinal rear roller mount rails spaced parallel from and bracketing the longitudinal centerline of said frame and joined between and to a pair of selected said inner cross support beams rearward of said turntable mounting plate;

two pairs of spaced transverse side roller mount rails, each said pair spaced parallel from and bracketing the transverse centerline of said spindle block bore;

a plurality of roller mounts joined to said table frame respectively with one roller mount joined between each said pair of facing roller mount rails, said roller mounts spaced radially and distributed along a selected circular path centered on the longitudinal centerline of said table frame and coaxial with said spindle block bore;

four table support rollers spaced radially and distributed one from another around a selected circular path defined by a selected roller track ring of a forward bale turntable assembly with the axis of rotation of each said roller in the same plane and each axis of rotation intersecting the vertical axis of said track ring and with each said roller equidistant from the center-point of said spindle block bore and rotatably and respectively mounted to one of said roller mounts and with said rollers mounted in a selected plane parallel to the plane of the upper surface of said table frame;

two spaced main pivot arms attached to rearward portions of said table frame, and each said pivot arm having a pivot arm bore coaxial one to another and, a table tilt actuator attachment bore coaxial one to another;

two sets of push bar mounts attached to selected underlying portions of said table frame;

two spaced bale push bars attached respectively and operatively to one of said spaced sets of push bar mounts;

two sets of push bar actuator mounts attached to selected underlying portions of said table frame;

two push bar actuators attached respectively and operatively between one of said push bar actuator mounts and one of said push bars;

an upper rearward structural table plate attached to a rearward upper portion of said table frame;

a front transverse wear strip spaced from a rearward transverse wear strip;

two forward side wear strips spaced one from the other the same distance as said transverse wear strips are spaced one from the other, thereby defining an open square that is bordered by upper coplanar surfaces of said transverse wear strips and said forward side wear strips centered around the vertical axis of said spindle block bore;

two spaced outer rearward side wear strips attached to outer portions of said rearward structural table plate spaced from and bracketing a rearward centerline wear strip attached to said table plate on the longitudinal centerline of said frame;

two spaced inner rearward wear strips spaced from and bracketing said centerline wear strip; and B. a forward bale turntable assembly comprising:

an elevatable and rotatable planar upper turntable structural plate;

a spindle attachment plate is attached centrally to the underside of said turntable structural plate;

a plurality of spaced longitudinal bale guide ribs distributed across and attached to the upper surface of said turntable structural plate;

a plurality of spaced turntable bale stops adjustably attached to said turntable structural plate to adjustably extend beyond the front edge of said turntable structural plate;

a circular turntable roller track ring having four track ring ramped roller detents, said ramps distributed and spaced radially 90 degrees one from another and corresponding to and cooperating with said rollers, each said detent having two intersecting ramps inclined downward from the horizontal plane of said track ring at a selected angle selected from a range of 18 to 24 degrees;

a turntable spindle shaft attached perpendicularly to the lower surface of said turntable structural plate at the center-point locus of said plate, said spindle shaft having an upper shaft attachment flange that can be reversibly attached coaxially to said spindle attachment plate;

a turntable spindle shaft bearing block having a centered vertical spindle shaft block bore, attached to said mounting plate with said block bore coaxial to said spindle bore, said bearing block having a centered vertical spindle shaft block bore sized to receive and rotatably retain said spindle shaft inserted therein and allow said shaft and said turntable structural plate some amount of operative up and down movement during rotation of said shaft and said structural plate;

a spindle shaft set collar reversibly secured coaxially to said spindle shaft spaced below said mounting plate to limit said shaft operative up and down movement during rotation of said shaft;

a spindle shaft bellcrank having two spread turntable rotation actuator mounting arms and a central transverse bore sized to receive and retain a lower distal end of said spindle shaft inserted therein, said bellcrank reversibly secured to said spindle shaft;

two turntable rotation actuators each said rotation actuator attached respectively between one of said mounting arms and a selected portion of said table frame; and C. a power system to power said actuators and a system of manual controls or computerized controls to control said actuators.

3. A rectangular bale receiving table having a forward bale turntable assembly for a mid-size or big bale transport vehicle for receiving and manipulating a plurality of bales and a related bale layer for deposit on a rear-hinged load table of said vehicle comprising:

a receiving table frame assembly operatively attached to a forward bale turntable assembly, said turntable assembly having a square shaped elevatable and rotatable planar upper turntable structural plate, said turntable structural plate having an underlying and attached planar and circular roller track ring, said track ring having four ramped roller detents spaced and distributed along the underside of said track ring, said track ring supported from below by four table support rollers, said support rollers roll below said track ring during forward and backward rotation of 90 degrees of rotation in a generally horizontal plane of said ring and plate and sequential elevation of said ring and plate as said rollers rotationally engage said detents, said turntable structural plate having an at rest position in a lower horizontal plane generally parallel to the horizontal plane of said table and transitions to a higher horizontal plane during transition of the 90 degrees from fore and aft to transverse to said table, and returns to said lower horizontal plane as said rollers engage said detents at the end of the 90 degrees of rotation and return said track ring and said structural plate to said lower horizontal plane in said transverse position, and connection of actuators to a suitable power system of said vehicle or to an auxiliary power system operatively attached to said table.

\* \* \* \* \*